United States Patent

[11] 3,583,726

[72] Inventor Oskar Lennart Lindblad
 Hedasgatan, Vargarda, Sweden
[21] Appl. No. 816,309
[22] Filed Apr. 15, 1969
[45] Patented June 8, 1971
[32] Priority Apr. 24, 1968
[33] Switzerland
[31] 6167/68

[54] VEHICLE WITH INCORPORATED SAFETY BELT
 10 Claims, 5 Drawing Figs.
[52] U.S. Cl. .................................................. 280/150SB,
 296/152
[51] Int. Cl. ...................................................... B60r 21/02
[50] Field of Search ............................................ 280/150
 SB, 150 B; 297/389; 296/152

[56] References Cited
UNITED STATES PATENTS
2,674,486 4/1954 Alderfer ...................... 280/150(B)
2,937,882 5/1960 Oppenheim .................. 280/150(SB)

*Primary Examiner*—Benjamin Hersh
*Assistant Examiner*—Robert R. Song
*Attorney*—Flynn & Frishauf ABSTRACT: There is disclosed a motor vehicle with incorporated safety belt, which comprises means for changing the relative position of a holder of the safety belt as a function of the opened or closed position of the door, so that when the door is opened, the safety belt is simultaneously brought into such a position that entering and leaving is possible without substantial obstruction, and the belt positions itself around the occupant when the door is closed.

OSKAR L. LINDBLAD
INVENTOR.

VEHICLE WITH INCORPORATED SAFETY BELT

The present invention relates to a motor vehicle with safety belt. There are already known safety belts in vehicles, which have, however, the drawback, that they are complicated to handle and rather time wasting.

It is a primary object of the present invention to provide an improved mechanism for substantially simplifying the fitting of safety belts around passengers without thereby reducing the safety.

A further object of the present invention is the provision of means in such manner, when the door of the vehicle is opened, the safety belt is simultaneously brought into such a position that entering and leaving of the passenger is possible without substantial obstruction, and the belt positions itself around the occupant when the door is closed.

Another, more specific object of the present invention relates to at least one mountings of a safety belt located on a holding member connected with the door of the vehicle and movable relative thereto, and means for changing the relative position of the holding member as a function of the position of the door, in order to facilitate entering and leaving the vehicle when the door is open.

The invention will be better understood, and objects other than those set forth above will become apparent, when consideration is given to the following detailed description thereof. Such description makes reference to the annexed drawings, wherein:

FIG. 5 is a view of a modification with a tackle.

Figure 1:
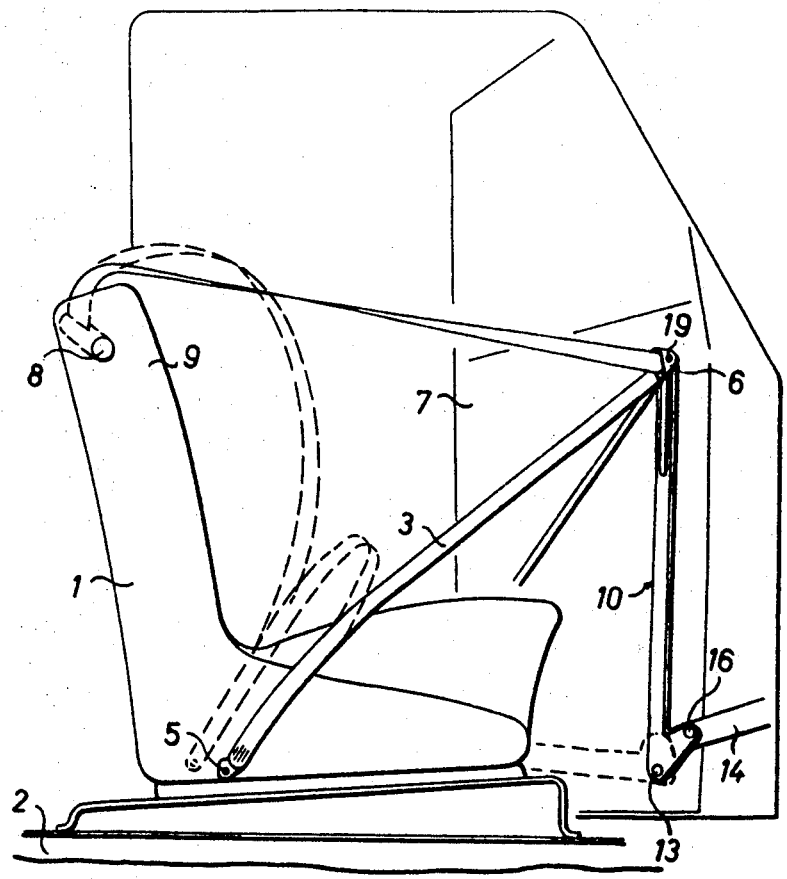
FIG. 1 is a view of the seat in a vehicle, with a safety belt, drawn in solid lines, indicating the position with the door open and in broken lines for the closed door.

A vehicle seat 1 for motor vehicles, preferably the seat for the driver, is connected with the vehicle frame 2, as known per se. A safety belt 3 is mounted rigidly below the seat surface 4 by means of an attachment screw 5 or other fixing means on the vehicle seat or on the floor or chassis of the vehicle. The safety belt 3, consisting of one piece, passes loosely through a slot of a holder 6. The other end of the safety belt 3 is mounted in a reeling-up device 8 on the rear part 9 of the seat 1. Such an apparatus is described in my copending application Ser. No. 763,646. The construction of this reeling-up device 8 is such that, under normal conditions, the belt can be pulled out and thereby extended, and can be pulled in by spring or motor force, whilst in the case of a sudden stress or pull, e.g., in the case of an accident, the belt is blocked against being pulled out so that the occupant of the seat is reliably supported and held by the safety belt 3. It would also be possible to mount the reeling-up device 8 or the corresponding end of the safety belt on the roof or window ledge of the vehicle.

A pin 19, mounted on the outer end of an angled lever 10, passes through the holder 6. This angled lever 10 has a first longer arm 11 and a second shorter arm 12 which is angled relative to the first arm. The lever 10 is mounted pivotably about a pivot 13 fixed to the door 7. When the door is closed, the arm 11 is extending substantially vertical. A flexible tension strip 14 is mounted on the short arm 12 and is fixed with its other end by a rivet 44 rigidly to the vehicle frame or chassis near the door. The articulated joint between tension strip 14 and arm 11 is made by a pin 16. Thus the flexible tension strip 14 projects on the side of the door hinge 42 above the vertical door gap. The hinges 42 are arranged near the outside of the door and in front of the seat. The longer arm 11 has an oblong slot 18, in which the pin 19 is displaceably guided. Simultaneously this pin 19 engages into en oblique slot 20 in the door plate 21. The outer end of the arm 11 is provided with a projecting lug 22 intended for locking. In the position shown in FIG. 3, that is, with the vehicle door closed this lug 22 engages behind a pivotable bolt or lever member 24. This bolt 24 is pivotable about a pivot 25 fixed to the door 7 and is pulled by a spring 26 into one end position. In addition, there is a locking member 28, urged by a spring 29 in the direction of the arrow B. This locking member 28 has a pin 30 which cooperates with the bolt 24. The locking member 28 is cranked outwardly into the gap of the door as shown in FIG. 4 and rests on the door pillar 40 when the door 7 is closed.

Figure 2:
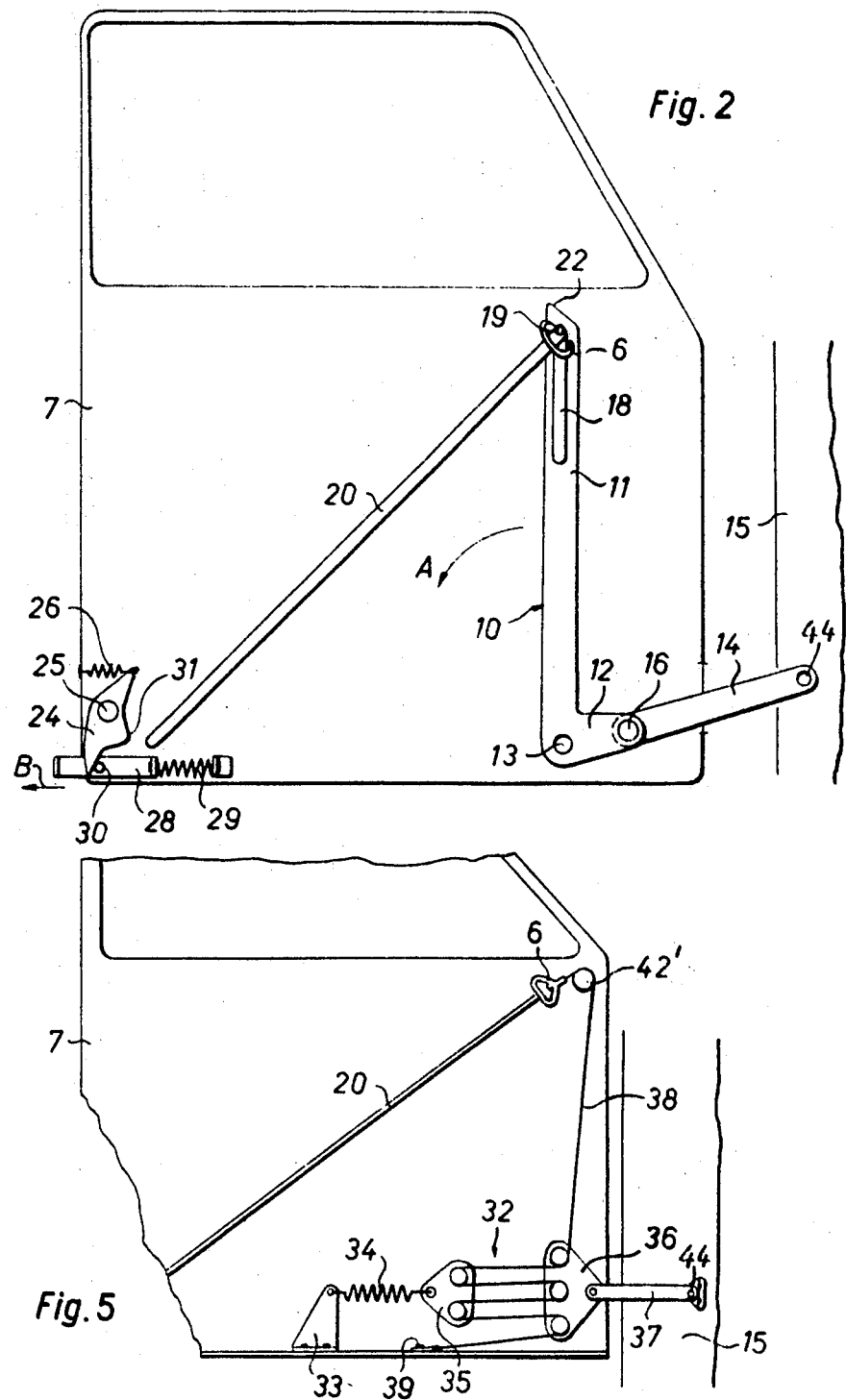
FIG. 2 is a view of the vehicle door in the open position, with the parts mounted thereon.
Figure 3:
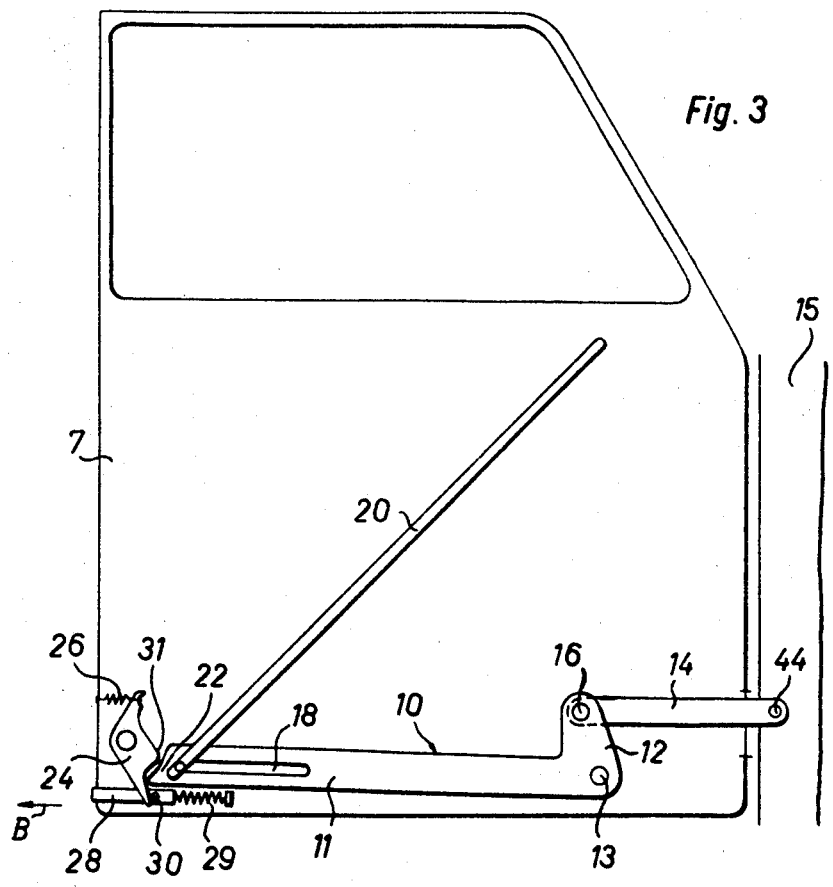
FIG. 3 is a view of the vehicle door with the parts mounted thereon, in the closed position.
Figure 4:
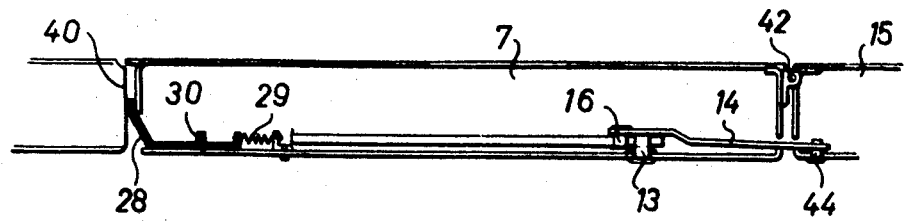
FIG. 4 is a horizontal cross section of the vehicle door of FIG. 3.

As may be seen from FIG. 3, the pivotable bolt 24 engages behind the lug of the arm 11, when the locking member 28 is in the retracted position, as shown. In this manner, the lever 10 can reach the position of FIG. 2 only when the door 7 is open and the locking member 28 assumes the position shown, in which the unlocking takes place. The arm 11 is positioned in the space between the inner and outer door plates.

It is also possible to mount the locking mechanism 24 to 30 on the vehicle frame or chassis instead of on the door. In this case the locking member 28 will be pushed into the locking position by the door. FIG. 5 shows a modification. Instead of an angled lever 10, the vehicle door 7 carries a tackle 32. A holder 33 is mounted on the inside of the door and cooperates with a strong tension spring 34 into which is hooked one part 35 or block of the tackle. The other part 36 or block of the tackle is fixed on a rope or flexible belt 37 which is retained on a fixed part or the vehicle frame 15, in a manner similar to the tension strip 14. The cable 38 which passes over the tackle 32 is fixed rigidly at one end 39 on the lower part of the door and passes with its other end over a roller 42' near the window, and is mounted on the holder 6. The safety belt 3 is pulled through this holder 6 and passes, similar to the embodiment of FIGS. 1 to 4, through an oblique slot 20 of the door 7 and can be moved along the same. When the door 7 is closed, the holder 6 is pulled into the bottom position, either by a rubber band, springs or weights, and in this position the locking means 24, 28 to 30, shown in FIGS. 2 and 3, are secured.

However, the unlocking may also be effected by means of the door operating mechanism, by actuating the door handle in the opening direction. When the lock is released, the holder 6 may assume the position of FIG. 5 under the pull of the spring 34 exerted on the cable 38.

The operation of the device according to FIGS. 1 to 4 is as follows: when the vehicle door 7 is open, the safety belt is in the position shown in solid lines in FIG. 1 because the flexible tension strip 14 pulls the longer arm 11 of the angled lever 10 into the vertical position. Thus the vehicle may be easily entered. If the door is subsequently closed, the safety belt 3 positions itself about the shoulder and the hip of the occupant and assumes the position shown in FIG. 1 by broken lines. During the closing of the door 7, the lever 11 pivots about the pivot 13, causing the pin 19 with the holder 6 to slide along the slot 20. This movement in the direction of the arrow A can be supported either by a spring, by weights, manually by means of a handle fitted to the pin 19, by an electric motor, or by hydraulic or pneumatic cylinders. In the lower end position the lug 22 engages behind a projection 31 of the rotary bolt 24 which slightly pivots in a clockwise direction at the start of an engagement and then reaches the locking position of FIG. 3 under the action of the spring 26, retaining the holder 6 in its position, because the locking member 28 abuts against the door pillar 40. The member 28 is released only by opening the door 7, enabling it to move in the direction of the arrow B pivoting by means of the pin 30 the rotary bolt 24 in a clockwise direction so that, during the further opening of the door 7, the lever 10 is pivoted by the tension strip 14 and reaches the position shown in FIGS. 1 and 2, enabling the occupant to leave the vehicle comfortably.

In the embodiment of FIG. 5 the operation takes place in an equivalent manner.

Each door of an automobile can be equipped with a mechanism and a safety belt according to the foregoing description.

What I claim is:

1. Mechanism for the positioning of a safety belt in a motor vehicle having a door hinged to the vehicle frame comprising
   a lever (10) pivotally mounted on the inside of the door, said lever (10) having a long arm (11) and a short arm (12) joined thereto a free end of said long arm adapted to engage said safety belt;
   a flexible tension member (14) connected to said short arm and the vehicle frame and located to bridge the door gap adjacent the hinges upon opening of the door;
   and a locking member (24) pivotally secured to said vehicle and cooperating with said free end (22) of the long arm of the lever and with said door, and locking the free end of said long arm in the closed position of said door.

2. Mechanism according to claim 1, including a locking bolt (28) located to cooperate with the locking member (24) and engageable by the door, when closed, and permitting unlocking of the lever only when the door is opened.

3. Vehicle having a frame (15);
   a door (7) hinged (42) to the frame;
   a restraining belt (3) secured at either end thereof to said vehicle frame;
   a slotted belt-holder (6) "thread on said belt" has been deleted and (3);
   guide means (20) formed on said door and engaged by said belt-holder, said guide means extending from a raised point (FIG. 1—solid lines) to a depressed point (FIG. 1—dashed lines) to guide the belt-holder (6) and thus said belt between an open, raised and a closed, depressed position;
   and operating means FIGS. 2—3: 10, 14; FIG. 5: 32, 38, 37) connected to said frame and to said belt-holder (6) moving said belt-holder to the raised point on said guide means upon opening of the door, and permitting said belt holder to move to the depressed point upon closing of the door.

4. Vehicle according to claim 3, wherein said belt (3) is secured to said vehicle frame at a floor point and at a raised point;
   a reeling-in device (8) is provided located at one of said points;
   said belt being looped through said belt-holder (6) and passing from one point towards, and through the belt-holder and back to the other point so that one portion of the belt between a point and the belt-holder (6) will fit over the shoulder and another portion between the belt-holder and the other point will fit over the hip of an occupant of a seat of the vehicle.

5. Vehicle according to claim 3, wherein said operating means comprises an operating member (10; 32, 38) secured to said belt-holder (6), said operating member being located inside the door;
   and said guide means (20) comprises a guide way extending, with respect to the direction of the direction of the vehicle, from the lower rear to the upper forward position of the door.

6. Vehicle according to claim 3, wherein FIGS. 1—4) said operating means comprises an angled lever pivotally mounted on the inside of the door, said lever having a short arm and long arm;
   and a flexible tension member interconnecting the short arm with the frame of the vehicle, said tension member bridging the vertical door gap at the hinge side of the door, the outer end of said long arm cooperating with said belt-holder, the outer end of said long arm moving with said belt-holder between a raised point and a depressed point.

7. Vehicle according to claim 6, including locking means secured to the vehicle and engageable with the outer end of the long arm when in depressed position;
   and means engageable by the door when in closed position and engaging said locking means to prevent movement of the angled lever when the door is closed.

8. Vehicle according to claim 5, including a locking means secured to the vehicle and engageable with said operating member when said operating member is at the lower rear position of the door;
   and means engageable by the door, when in closed position, and engaging said locking means to prevent movement of said operating member when the door is closed.

9. Vehicle according to claim 7, wherein said locking means and said door engageable means comprises a locking bolt and a locking lever, said bolt and lever being mounted on said door.

10. Vehicle according to claim 3, wherein said operating means comprises a tackle with a pull cable, one part of said tackle being mounted on the door and the other part on the vehicle frame, and bridging the vertical door gap adjacent to the hinges of the door; said belt-holder (6) being secured to said pull cable.

UNITED STATES PATENT OFFICE
CERTIFICATE OF CORRECTION

Patent No. 3,583,726  Dated June 8, 1971

Inventor(s) Oskar Lennart Lindblad

It is certified that error appears in the above-identified patent and that said Letters Patent are hereby corrected as shown below:

Column 3, lines 22 and 23, should read -- A slotted belt-holder (6) slidably engaged with said belt intermediate the ends thereof; --.

Signed and sealed this 23rd day of May 1972.

(SEAL)
Attest:

EDWARD M. FLETCHER, JR.  ROBERT GOTTSCHALK
Attesting Officer  Commissioner of Patents